Sept. 6, 1927.  A. G. BRIDGFORD ET AL  1,641,728

MANIFOLD HEATER FOR INTERNAL COMBUSTION ENGINES

Filed July 3, 1925  4 Sheets-Sheet 1

INVENTORS.
Archie G. Bridgford and
Sidney B. Bollon,
BY Walter N. Haskell.
their ATTORNEY.

INVENTORS
Archie G. Bridgford, and
Sidney B. Bolton.
BY Walter N. Haskell
their ATTORNEY.

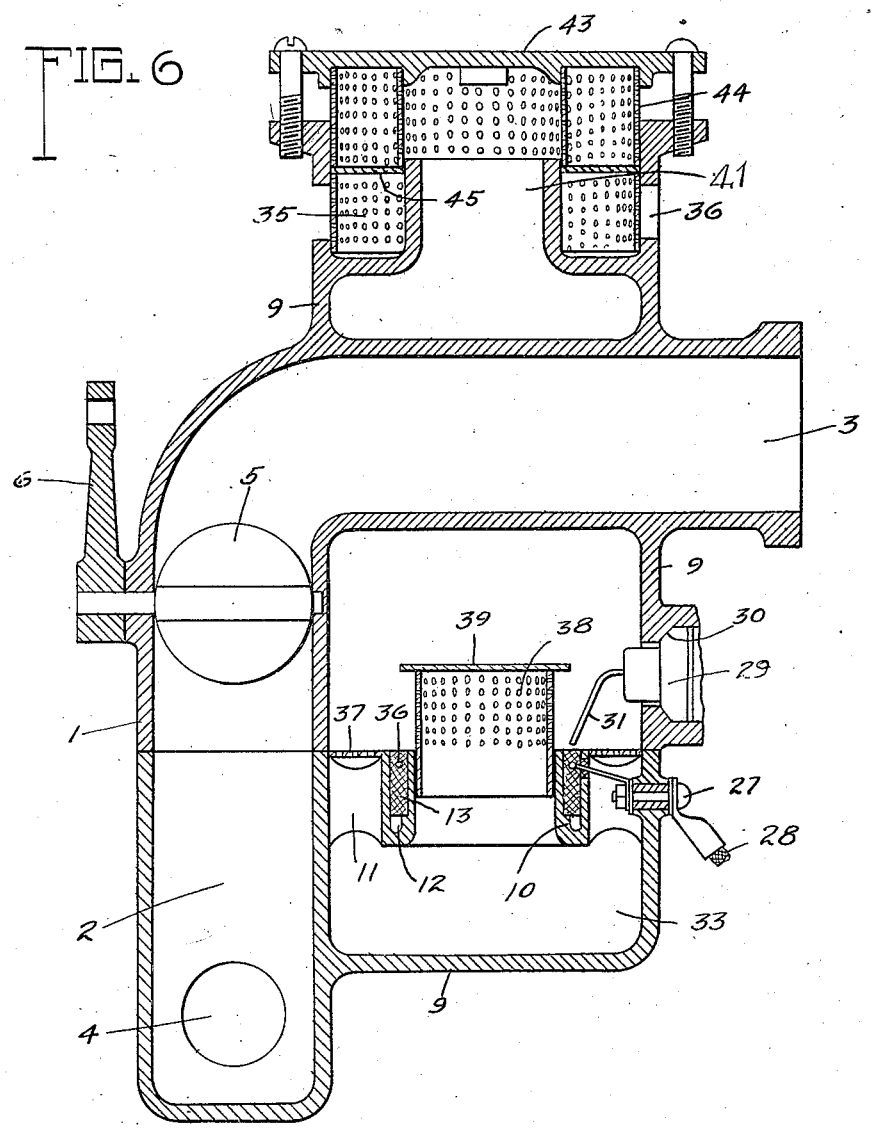

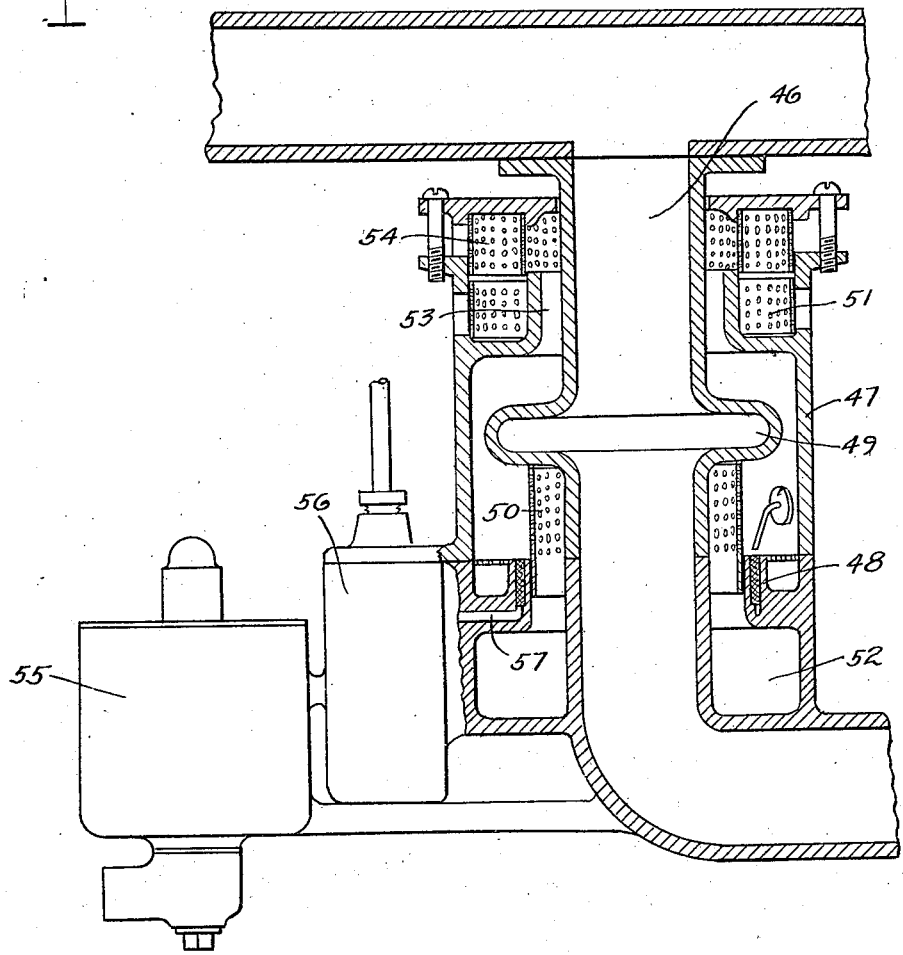

Patented Sept. 6, 1927.

1,641,728

UNITED STATES PATENT OFFICE.

ARCHIE G. BRIDGFORD AND SIDNEY B. BOLTON, OF ALEDO, ILLINOIS; SAID SIDNEY B. BOLTON ASSIGNOR TO SAID ARCHIE G. BRIDGFORD.

MANIFOLD HEATER FOR INTERNAL-COMBUSTION ENGINES.

Application filed July 3, 1925. Serial No. 41,412.

Our invention has reference to a manifold heater for internal combustion engines, and has for its purpose to provide a novel and efficient means for initially heating the intake manifold of an engine under the more unfavorable conditions attendant upon low temperatures, and thereby expediting the starting of the engine. It seeks to improve upon a similar device for which Letters Patent of the United States No. 1,427,059 were issued to us August 22nd, 1922. In said former device it was undertaken to determine a proper charge of fuel oil to be used in the heating operation by means of a system of valves, but these valves, and the proper spacing thereof, required careful adjustment, and the same were liable to get out of order. They were therefore not entirely satisfactory. In the present invention it is sought to determine the proper amount of oil to be used by means of a measuring chamber, into which a small quantity of the hydro-carbon is drawn from the float-chamber, and from which it is expelled by a displacement operation.

Another feature of the invention consists in the positioning of the heater and float chamber in such a manner with relation to each other, that in the event of the float chamber being flooded at any time, the contents thereof will not find its way into the heater by force of gravity or otherwise, so as to interfere with the perfect operation thereof.

Another feature of the invention consists in a close association of the heater devices and fuel mixing parts, resulting in a compact structure, and permitting a convenient positioning of the float chamber, for the purpose of supplying fuel both to the intake manifold and to the auxiliary heater therefor.

Another object thereof is to provide a novel air supply mechanism, for furnishing a desired quantity of fresh air to the heater devices, said mechanism being so constructed and arranged as to preclude the danger of a current of air therein interfering with the proper action of the burner, or extinguishing the flame thereof.

Another purpose thereof is to provide a device which can be applied to an intake manifold disposed in a horizontal position, or one that is in a vertical position.

The above-named, and other features and advantages of the invention will more fully appear from the following specification, taken in connection with the accompanying drawings, in which:

Fig. 6 is a vertical section on the broken line 6—6 of Fig. 3.

Fig. 7 shows a modified arrangement of the invention partially in section, as the same is applied to a vertical intake pipe.

Figure 1:
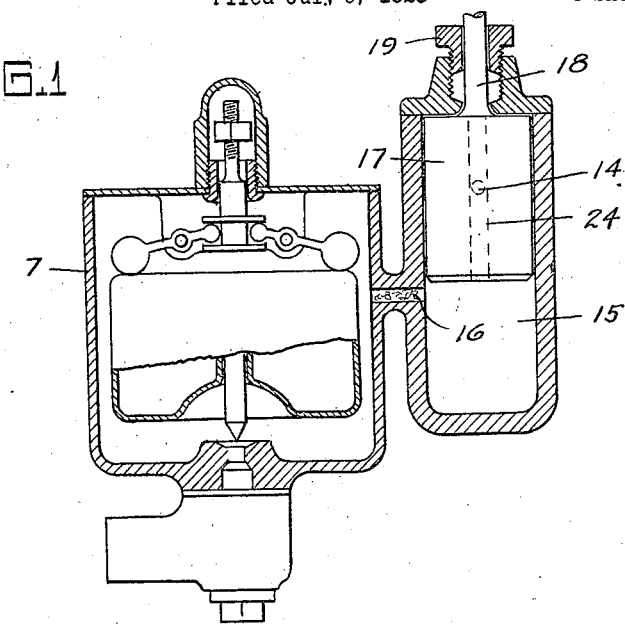
Fig. 1 is a vertical section of the float chamber and measuring chamber, on the broken line 1—1 of Fig. 3.
Figure 2:
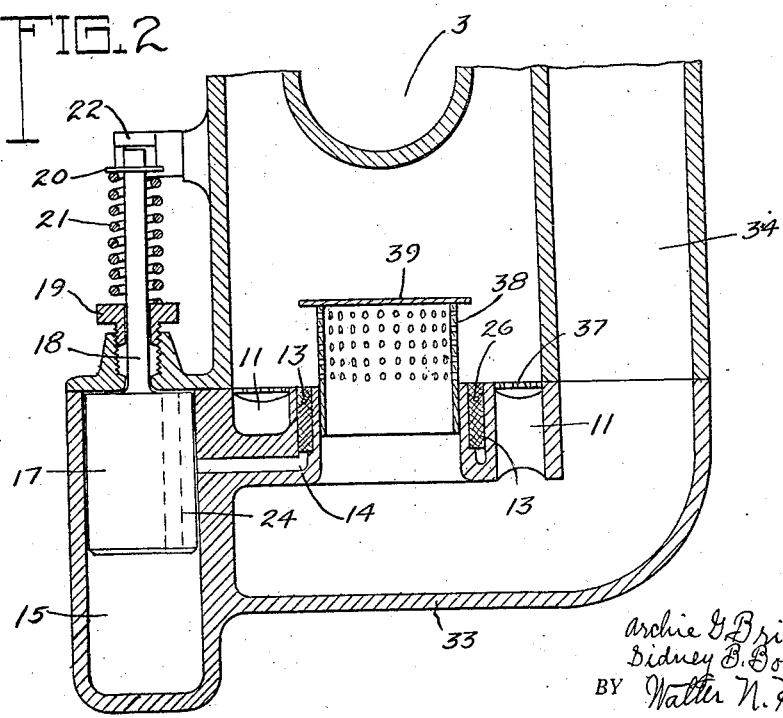
Fig. 2 is a fragmentary vertical section on the broken line 2—2 of Fig. 3.
Figure 3:
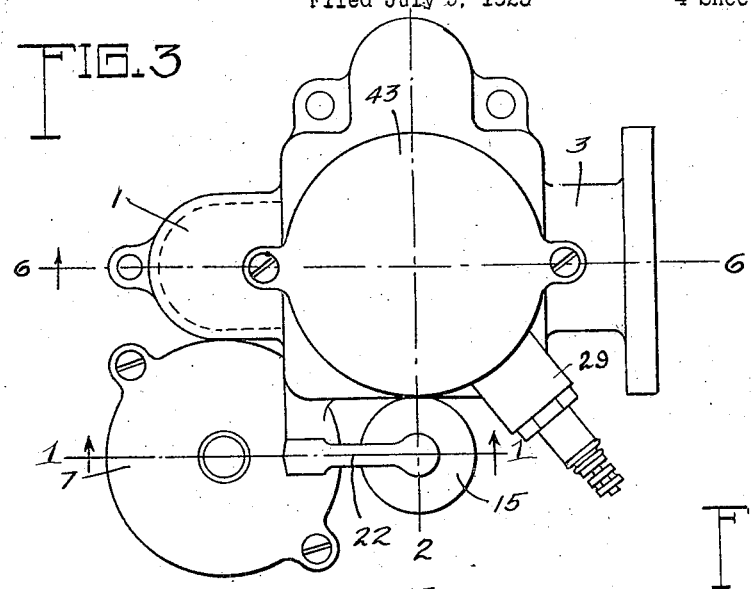
Fig. 3 is a plan view of the invention.
Figure 4:
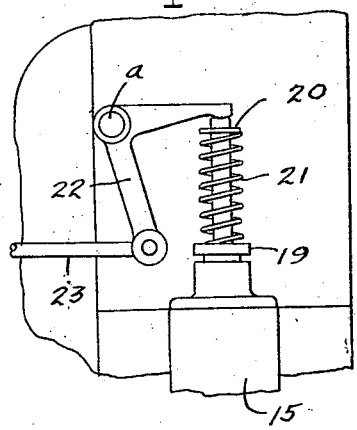
Fig. 4 is a detail of the plunger operating devices.
Figure 5:
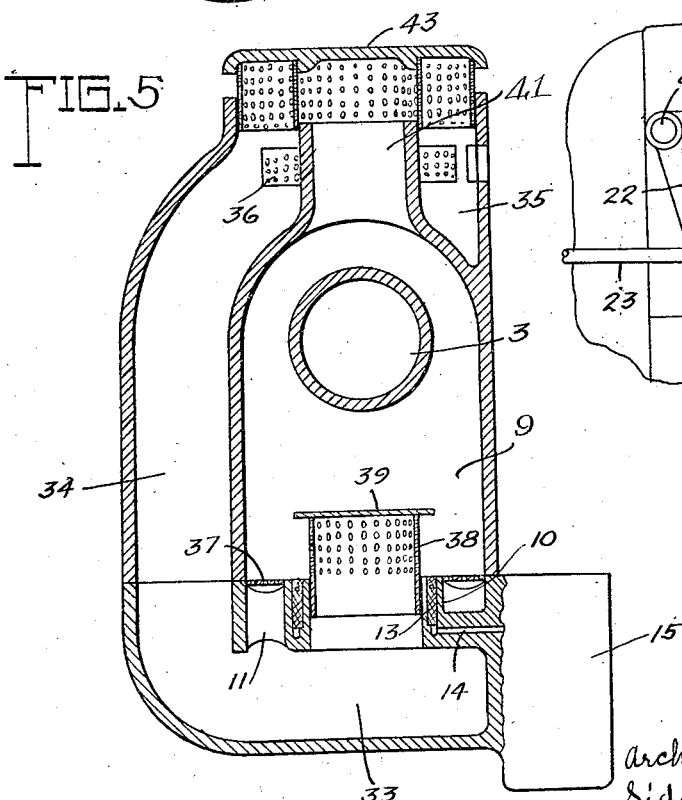
Fig. 5 is a vertical section on the same line as Fig. 2, but in the opposite direction.

The reference number 1 indicates a tubing, in the lower part of which is a mixing chamber 2, said tubing being projected at an angle into an intake pipe 3, or manifold, adapted for connection with an engine of the class mentioned. (Fig. 6.) In the lower end of the chamber 2 is an air intake 4, and in the upper part thereof is a throttle valve 5, controlled by a lever 6. Adjacent to the lower end of the tubing 1 is a float chamber 7 of usual construction, and provided with means of communication with a source of liquid fuel supply. Said float chamber is also in communication with the chamber 2, so as to furnish thereto a supply of hydro-carbon, to be mixed therein with the current of air to form the successive vapor charges for the engine.

Partially enclosing the intake manifold 3 is a casing 9, in the lower part of which is centrally supported a burner ring 10, by means of supports 11 connecting said ring and the wall of the casing at regular spaced intervals. The ring 10 is of double formation, containing a space 12 in which is a circular wick 13. The lower end of the space 12 communicates through a passage 14 with a measuring chamber 15 supported at one side of the casing 9, said chamber being also connected with the float-chamber 7 through a channel 16, (Fig. 1). The passage 14 is normally closed by a plunger 17, on the end of a stem 18, projected upwardly through a plug 19 on the end of the chamber 15, between which and a collar 20 on said stem is interposed an extensile coiled spring 21, the tension of which operates to hold the plunger 17 in the upper part of the chamber 15. The stem and plunger are capable of being depressed by means of a bell-crank lever 22, fulcrumed on the side of the casing 9, as at $a$, and provided with an operator's rod 23 which may extend to the instrument board of the automobile, or other point convenient for operation. Extending through the plunger 17 is an opening 24, shown in broken lines, permitting the passage of fuel oil in the chamber 15 from the lower end thereof to the upper end.

In the upper part of the wick 13 is a wire coil 26, connected with a terminal 27, having an insulated seating in the wall of the casing 9, and connected by a wire 28 with the source of electrical energy on the motor vehicle. By this means the wire coil is heated simultaneously with the supplying of a charge of oil to the wick 13, expediting the generation of vapor at the upper end of the wick, and hastening the heating process. The vapor thus formed is ignited by means of a spark-plug 29 in a seat 30 in the casing 9, the point 31 of said spark-plug being in close proximity to the upper end of the burner ring 10, so as to cause a spark between said parts upon the spark-plug being energized.

A current of air is supplied to the space 33 below the burner 10 by means of a pipe 34, at one side of the casing 9, and connected at its upper end with a chamber 35, provided with screened openings 36, through which the outside air enters said chamber. After entering the space 33 the air passes upwardly on both the interior and exterior of the burner ring, the part going outside thereof passing between the supports 11 and through a perforated plate 37 encircling the burner. The part of the air which enters the burner passes upwardly through openings in the sides of a cylinder 38, the upper end of which is closed by a plate 39. This causes a spreading of the inner current of air into the path of the flame, producing a more perfect combustion, together with the air passing upwardly on the outside of the flame. The heat thus generated is directed against and about the pipe 3, rapidly raising the temperature thereof, and of the gases passing through the same. The exhaust gases pass outwardly through a contracted opening 41 in the top of the casing 9, said opening being partially enclosed by a muffler formed of a top plate 43, secured to the casing 9, and perforated side plates 44. Said muffler is seated just above the air intake chamber 35, and separated therefrom by a plate 45. One of the functions of said muffler is to prevent a back draft through the casing 9, such as might tend to extinguish the flame of the burner therein.

In the operation of a device of this kind it is only necessary to have the flame in operation for a limited amount of time, until the parts become sufficiently heated to operate satisfactorily, and the chamber 15 is provided with a sufficient capacity to hold the desired amount of fuel oil for such purpose. When the plunger 17 is in its normal position the lower part of the chamber will be filled from the float chamber, and when it is desired to conduct such charge to the burner mechanism the plunger is forced downwardly, the oil in the lower part of the chamber passing upwardly through the opening 24, and, after the plunger has moved downwardly a sufficient distance to uncover the channel 14, the charge passes through such channel to the burner.

The parts are so arranged that the channel 14 will be about on a level with the upper part of the float-chamber, so that in the event of the float-chamber being flooded, an excess of the oil could not force itself into the burner compartment, to interfere with the operation therein.

In Fig. 7 is shown an arrangement of the invention for use with an intake manifold having in part a vertical pipe as shown at 46. The general arrangement of the parts is the same as in the construction hereinbefore set forth, except that a casing 47 and burner ring 48 of relatively greater diameter are made use of, to accommodate the pipe 46 in the center thereof. The pipe 46 is provided with an enlargement 49, from which a perforated casing 50 extends downwardly to the inner face of the burner ring. The current of air passing upwardly on the inside of the burner passes through said perforations and mixes with the air passing upwardly on the outside of the burner ring, the enlargement 49 acting as a spreader therefor. In the upper part of the casing 47 is an air intake chamber 51, from which the air is conducted downwardly to a chamber 52 in the lower part of the casing, as in the former construction. The chamber 51 surrounds an outlet 53 for the exhaust gases, from which outlet the gases pass into a chamber 54, and outwardly through openings in the walls thereof. This arrangement is substantially the same as in the other form, except that the pipe 46 extends upwardly through the top of the chamber 54. The burner is supplied with fuel from a float-chamber 55, passing through a measuring chamber 56, in communication with the burner through a passage 57, the oil being conducted from the measuring chamber to the burner in the manner hereinbefore described. Means for vaporizing the fuel and igniting the same are also provided.

Other changes can be made in the construction and arrangement of the invention, without departing from the spirit thereof, as set forth herein.

What we claim, and desire to secure by Letters Patent, is:

1. In a device of the class described, the combination of a casing and manifold pipe extending therethrough, a burner mechanism in said casing, in proximity to said manifold, means for supplying a current of air to said casing, a fuel measuring chamber connected with said burner mechanism adapted to receive a predetermined quantity of liquid fuel, and a perforated plunger in said chamber capable of transferring said liquid fuel from one end of said chamber to the other, for passage to said burner mechanism.

2. In a manifold heater, a casing for enclosing the manifold, a burner-ring supported in said casing, so as to permit the passage of air through the center and at the sides thereof, means for conducting a current of air through said casing, a measuring chamber in communication with said burner, and adapted to receive a predetermined quantity of liquid fuel, a displacing member in said measuring chamber, and means for the manual operation of said displacing member.

3. In a manifold heater, a casing for enclosing the manifold, means for conducting a current of air through said casing, a burner mechanism supported in said casing in proximity to said manifold, having a central opening and spaces on the outside thereof for the passage of said air current, an air distributing member centrally of said burner mechanism, means for conducting successive measured charges of fuel oil to said burner mechanism, means for expediting the vaporization of said fuel oil, and means for the ignition thereof.

4. In a manifold heater, a casing for enclosing the manifold, a burner mechanism within said casing, means for providing said burner mechanism with a current of air, an oil feed chamber in communication with said burner mechanism, a plunger held normally in one end of said chamber, and provided with means for the passage of said oil from one end of the plunger to the other, means for manual operation of said plunger, to force the oil in said chamber from one end thereof to the other, permitting the escape thereof to said burner mechanism, and means for igniting the vapor formed from said oil.

5. In combination with a suitable casing and float-chamber in proximity thereto, a manifold pipe extending through said casing and in communication with said float-chamber, means for providing said casing with a current of air, a measuring chamber in communication with said float-chamber, a burner mechanism in said casing, provided with means for communicating with said measuring chamber at a point above the highest point in said float chamber, means for conducting the contents of said measuring chamber in successive charges to said burner mechanism, and means for igniting the vapor formed in said casing.

6. In a manifold heater, a casing for enclosing the manifold, a burner mechanism supported in said casing in proximity to said manifold, a fuel chamber communicating in one direction with a source of fuel supply and in the other direction with said burner mechanism, a plunger perforated longitudinally operable in said chamber to transfer a charge of fuel therein from one end thereof to the other, said plunger normally closing the communication between said chamber and the burner mechanism, and means for actuating said plunger.

7. In a manifold heater, a casing for enclosing the manifold, a burner mechanism supported in said casing in proximity to said manifold, an air supply passage entering the lower end of said casing and having an intake above the same, a muffler device in communication with the upper part of said casing, above said intake, and means for supplying said burner mechanism with successive charges of liquid fuel.

In testimony whereof we affix our signatures.

ARCHIE G. BRIDGFORD.
SIDNEY B. BOLTON.